US008666959B2

(12) United States Patent
Hirose et al.

(10) Patent No.: US 8,666,959 B2
(45) Date of Patent: Mar. 4, 2014

(54) DATA ACCESS DEVICE, DATA ACCESS METHOD AND DATA ACCESS PROGRAM

(75) Inventors: Junichiroh Hirose, Tokyo (JP); Toru Kawashima, Tokyo (JP)

(73) Assignee: NTT Data Corporation, Tokyo (JP)

( * ) Notice: Subject to any disclaimer, the term of this patent is extended or adjusted under 35 U.S.C. 154(b) by 2 days.

(21) Appl. No.: 13/394,548

(22) PCT Filed: Oct. 21, 2010

(86) PCT No.: PCT/JP2010/068568
§ 371 (c)(1),
(2), (4) Date: Mar. 6, 2012

(87) PCT Pub. No.: WO2011/052467
PCT Pub. Date: May 5, 2011

(65) Prior Publication Data
US 2012/0271804 A1    Oct. 25, 2012

(30) Foreign Application Priority Data
Oct. 30, 2009   (JP) .................................. 2009-250513

(51) Int. Cl.
*G06F 17/30* (2006.01)
(52) U.S. Cl.
USPC ............ 707/704; 707/781; 711/156; 711/158
(58) Field of Classification Search
None
See application file for complete search history.

(56) References Cited

U.S. PATENT DOCUMENTS

2008/0154900 A1 * 6/2008 Matsumoto et al. ............... 707/7
2009/0193025 A1 * 7/2009 Iwamoto .......................... 707/8

FOREIGN PATENT DOCUMENTS

| JP | 62-232064 | 10/1987 |
| JP | 05-46415 | 2/1993 |
| JP | 06-332780 | 12/1994 |
| JP | 2002-007148 | 1/2002 |
| JP | 2008-165272 | 7/2008 |

OTHER PUBLICATIONS

International Search Report, PCT/JP2010/068568, dated Nov. 22, 2010.

* cited by examiner

*Primary Examiner* — Pierre Vital
*Assistant Examiner* — David T Brooks
(74) *Attorney, Agent, or Firm* — Nixon Peabody LLP

(57) ABSTRACT

A data access device provided with a sequence storage unit which stores in advance a sequence for accessing the data contained in each of the multiple data units stored in a data storage section. The data access device receives and stores in the data access request storage section multiple data access requests for any of the multiple stored data units, determines an execution sequence for the multiple stored data access requests that corresponds to the aforementioned sequence stored in the sequence storage unit, locks the data units to be accessed as per the data access requests, sequentially implements the data access requests in the determined execution sequence, and removes all the locks after implementing all of the stored data access requests.

14 Claims, 13 Drawing Sheets

| ACCOUNT | |
|---|---|
| ACCOUNT NO. | BALANCE |
| 00x | 1000 |
| 00y | 5000 |

| ACCOUNT UPDATE DETAILS | | | | |
|---|---|---|---|---|
| ACCOUNT NO. | TRANSACTION TYPE | TRANSACTION AMOUNT | BALANCE AFTER TRANSACTION | UPDATE DATE |
| 00x | INCOMING PAYMENT | 100 | 1100 | 2009/9/18 |
| 00y | OUTGOING PAYMENT | -100 | 4900 | 2009/9/18 |

| STOCKED PRODUCT | | |
|---|---|---|
| STOCKIST | PRODUCT CODE | IN STOCK |
| X | P | 5 |
| Y | P | 1 |

| STOCK UPDATE DETAILS | | | | |
|---|---|---|---|---|
| STOCKIST | PRODUCT CODE | STOCK UPDATE TYPE | STOCK QUANTITY AFTER UPDATE | UPDATE DATE |
| X | P | OUTGOING STOCK | 4 | 2009/9/18 |
| Y | P | INCOMING STOCK | 2 | 2009/9/18 |

| DB TABLE NAME | DB TABLE UPDATE SEQUENCE |
|---|---|
| ACCOUNT | 3 |
| ACCOUNT UPDATE DETAILS | 4 |
| STOCKED PRODUCT | 1 |
| STOCK UPDATE DETAILS | 2 |

FIG. 14A

```
X TRANSACTION (INPUT INFORMATION) {
  START TRANSACTION;

CHECK INPUT INFORMATION;

READ INFORMATION a FROM TABLE A;
  READ INFORMATION b FROM TABLE B;
  READ INFORMATION c FROM TABLE C;

CHECK INPUT INFORMATION AND a;
  CHECK INPUT INFORMATION AND b;
  CALCULATE a;
  CALCULATE b;

REFLECT CALCULATION RESULT IN a;
  REFLECT CALCULATION RESULT IN b;
  COUNT UP c;

UPDATE a IN DB;
  UPDATE b IN DB;
  UPDATE c IN DB;

RECORD INPUT INFORMATION;
  RECORD PROCESSING EXECUTION HISTORY;

COMMIT TRANSACTION;
}
```

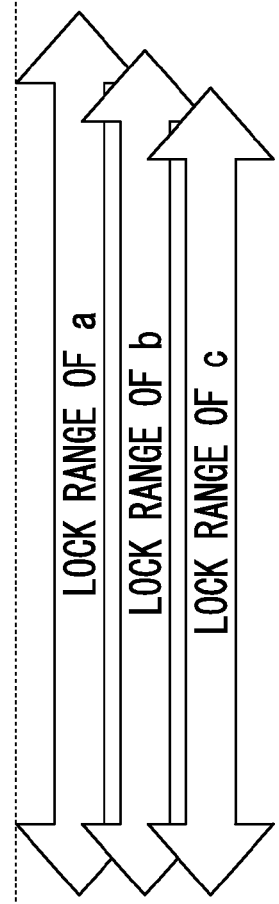

DATA ACCESS DEVICE, DATA ACCESS METHOD AND DATA ACCESS PROGRAM

CROSS REFERENCE TO RELATED APPLICATIONS OR PRIORITY CLAIM

This application is a National Phase of PCT/JP2010/068568, filed Oct. 21, 2010, entitled, "DATA ACCESS DEVICE, DATA ACCESS METHOD AND DATA ACCESS PROGRAM", and which claims priority of Japanese Patent Application No. 2009-250513, filed Oct. 30, 2009, the contents of which are incorporated herein by reference in their entirety.

TECHNICAL FIELD

The present invention relates to technology that avoids deadlocks and performs data accessing efficiently.
Priority is claimed on Japanese Patent Application No. 2009-250513, filed Oct. 30, 2009, the contents of which are incorporated herein by reference.

BACKGROUND ART

In computer processing, sometimes deadlocks occur when a plurality of processing units such as processes or threads that are performing parallel processing each waiting for the others to end their processing, while none of the processing is able to end. For example, when a plurality of processing units are updating data that is contained in the same data file or database table, exclusive control is performed in which the data is locked so that it cannot be updated by other processing units in order to maintain data consistency. In this case, there are instances when the processing becomes stalled because the plurality of processing units are each waiting for the data locked by the others to be released.

In order to avoid this type of deadlock, Patent document 1, for example, discloses a technology which requires all of the data to be updated firstly locked, and then updated, in case that data is updated in a plurality of files in which there is a possibility of a deadlock occurring. Patent document 2 discloses a technology in which the data to be updated is read in a virtual area, and after performing arithmetic processing in the virtual area, the data is locked so that only the calculation results are reflected in the data.

DOCUMENTS OF THE PRIOR ART

Patent Documents

[Patent Document 1]
Japanese Unexamined Patent Application, First Publication, (JP-A) No. 2002-7148
[Patent Document 2]
Japanese Unexamined Patent Application, First Publication, (JP-A) No. 2008-165272

DISCLOSURE OF INVENTION

Problem to be Solved by the Invention

However, in the technology described in Patent document 1, because all of the plurality of data items to be accessed are locked in advance, and this lock is only released after the access processing has been completed, all of the other processing units that are performing processing to access the locked data are placed in a waiting state so that the processing concurrency is impaired and the throughput deteriorates. In the technology described in Patent document 2, after the data to be updated has been read in a virtual area, in cases such as when other access processing is performed before this data can be reflected in the actual data, processing such as rollback processing is performed as a result of an exclusive error. In this case, exclusive errors occur frequently when there is a concentration of data access processing, and the processing performance deteriorates.

The present invention was conceived in view of the above described circumstances. The present invention provides a data access device, a data access method, and a data access program that make it possible to avoid deadlocks and perform data accessing while maintaining a superior processing performance.

Means for Solving the Problem

In order to solve the above described problems, according to the present invention, there is provided a data access device that accesses a data storage section in which data is stored in a plurality of data units, including: a sequence storage section which stores in advance a sequence according to which accesses should be made to data contained in the data units; a data access request storage section which stores data access requests to access one of the data units from among the plurality of data units stored in the data storage section; a data access request registration section which receives a plurality of the data access requests, and stores the data access requests in the data access request storage section; an execution sequence sorting section which determines an execution sequence for the plurality of data access requests that are stored in the data access request storage section in accordance with the sequence stored in the sequence storage section; and a data access request execution section which sequentially performs data access request execution processing in accordance with the execution sequence determined by the execution sequence sorting section with the data unit which is a target of the data access request locked, and after the data access request execution processing has been performed for all of the data access requests stored in the data access request storage section, releases all of the locks on the data units.

In the data access device of the present invention, it is also possible for the data access request registration section to receive transaction processing requests to which a plurality of the data access requests to access a plurality of the data units have already been assigned, and to store the data access requests that correspond to the input relevant transaction processing requests in the data access request storage section.

In the data access device of the present invention, it is also possible for the sequence storage section to store, from among the plurality of data units, the data units which are accessed at a relatively high frequency, at a relatively later sequential order, and the data units which are accessed at a relatively low frequency, at a relatively earlier sequential order.

In addition, according to the present invention, there is provided a data access method that is employed by a data access device including a data storage section which stores data in a plurality of data units, a sequence storage section which stores in advance a sequence according to which accesses should be made to data contained in the data units, and a data access request storage section which stores data access requests to access one of the data units from among the plurality of data units stored in the data storage section, the data access method comprising the steps of: receiving a plurality of the data access requests so as to store the data access requests in the data access request storage section; determining an execution sequence for the plurality of data access requests that are stored in the data access request storage section in accordance with the sequence stored in the sequence storage section; and sequentially performing data access request execution processing in accordance with the determined execution sequence with the data unit which is a target of the data access request locked, and after the data access request execution processing has been performed for all of the data access requests stored in the data access request storage section, releasing all of the locks on the data units.

Moreover, the present invention is a data access program that causes a computer equipped with a data access device including a data storage section which stores data in a plurality of data units, a sequence storage section which stores in advance a sequence according to which accesses should be made to data contained in the data units, and a data access request storage section which stores data access requests to access one of the data units from among the plurality of data units stored in the data storage section, to execute the steps of: receiving a plurality of the data access requests so as to store the data access requests in the data access request storage section; determining an execution sequence for the plurality of data access requests that are stored in the data access request storage section in accordance with the sequence stored in the sequence storage section; and sequentially performing data access request execution processing in accordance with the determined execution sequence with the data unit which is a target of the data access request locked, and after the data access request execution processing has been performed for all of the data access requests stored in the data access request storage section, releasing all of the locks on the data units.

Effect of the Invention

According to the present invention, it is possible to avoid deadlocks and perform data accessing while maintaining a superior processing performance.

BRIEF DESCRIPTION OF THE DRAWINGS

FIG. 4 is a view showing a data example of information stored in an account table according to an embodiment of the present invention.

FIG. 5 is a view showing a data example of information stored in an account update details table according to an embodiment of the present invention.

FIG. 6 is a view showing a data example of information stored in a stocked product table according to an embodiment of the present invention.

FIG. 7 is a view showing a data example of information stored in a stock update details table according to an embodiment of the present invention.

FIG. 14A is a view illustrating a transaction processing for data access processing according to the conventional technology.

EMBODIMENTS FOR CARRYING OUT THE INVENTION

Figure 1:
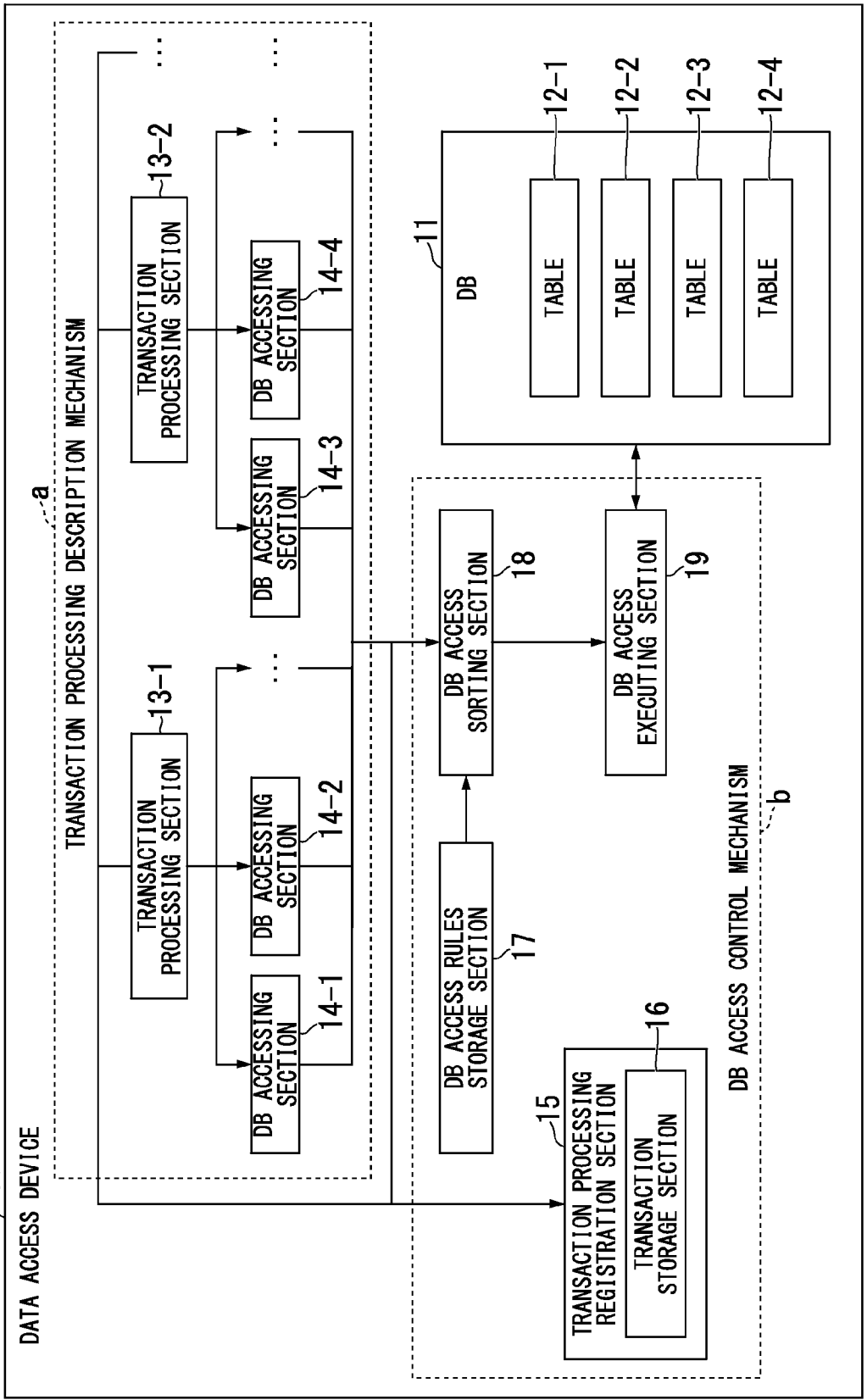
FIG. 1 is a block diagram showing an example of the structure of a data access device according to an embodiment of the present invention.

Hereinafter, an embodiment of the present invention will be described with reference made to the drawings. FIG. 1 is a block diagram showing an example of the structure of a data access device 10 of the present embodiment. The data access device 10 is a computer device, and is provided with a transaction processing description mechanism a, a database (DB) access control mechanism b, and a database (DB) 11. The transaction processing description mechanism a is provided with a plurality of transaction processing sections 13-1, 13-2, . . . , and with a plurality of DB accessing sections 14-1, 14-2, 14-3, 14-4, . . . . The DB access control mechanism b is provided with a transaction processing registration section 15, a DB access rules storage section 17, a DB access sorting section 18, and a DB access executing section 19 in order to control the data accessing by the transaction processing sections and the DB accessing sections.

Figure 2:
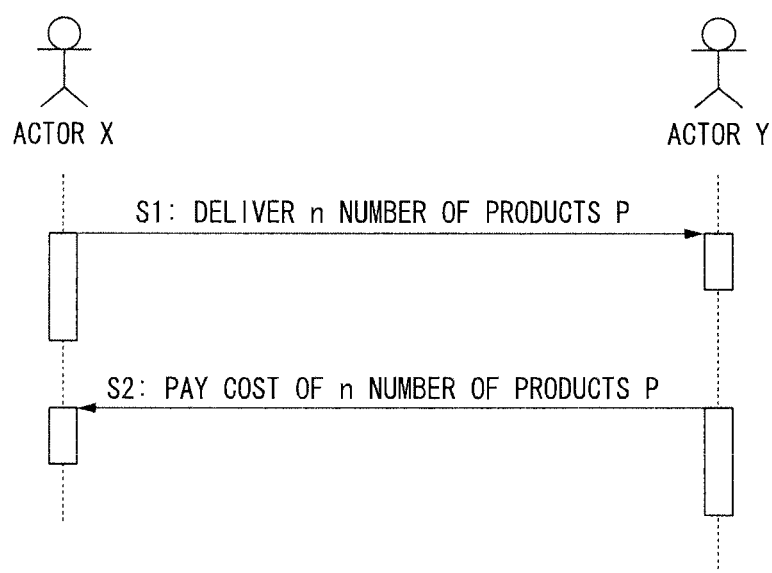
FIG. 2 is a view showing an example of transaction processing according to an embodiment of the present invention.

In the present embodiment an example is described in which the data access device 10 performs what is known as a compound transaction type of transaction processing (see FIG. 2). Compound transactions are transactions in which the delivery of a product and the payment of the corresponding remuneration are performed at the same time. Here, for example, an actor X delivers n number of products P which he possesses to an actor Y (step S1), while, in response to this, the actor Y pays the cost for the n number of the products P to the actor X (step S2).

Figure 3:
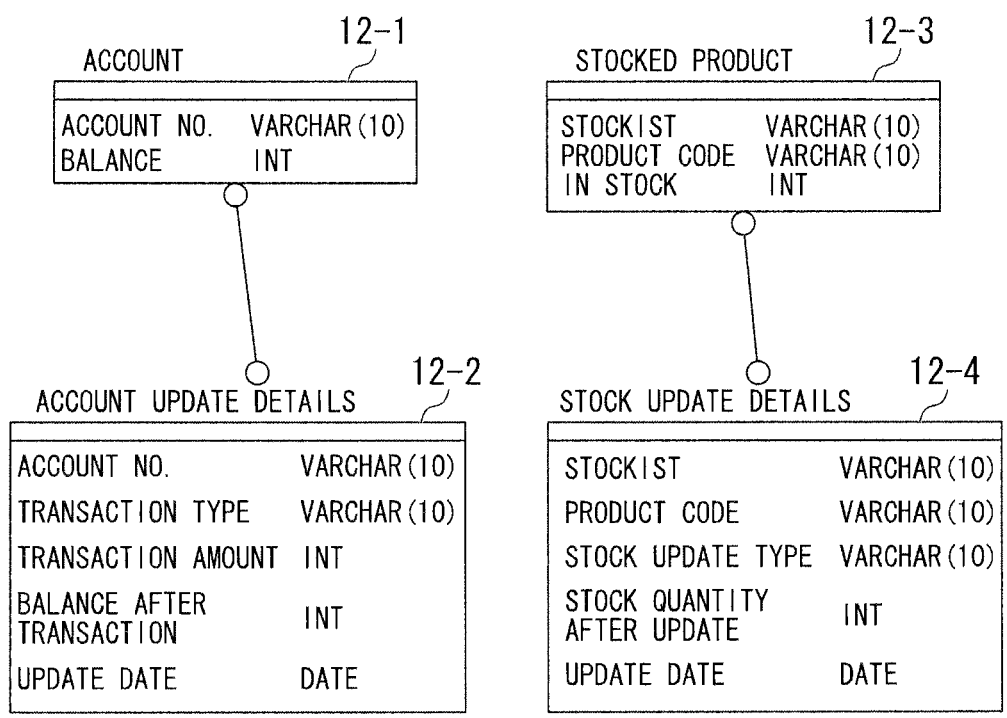
FIG. 3 is an ER diagram illustrating the relation between tables stored in a data storage section according to an embodiment of the present invention.

Returning to FIG. 1, DB 11 is a data storage section in which data is stored in each of a plurality of data units. In the present embodiment, tables to which the data in each column has been assigned are used as the data units, and a plurality of these tables (i.e., an account table 12-1, an account update details table 12-2, a stocked product table 12-3, a stock update details table 12-4, . . . ) are stored in the DB 11. Here, these four tables are described as an example, however, it is also possible for an optional plurality of tables to be stored in the DB 11 in accordance with the transaction requirements. FIG. 3 is an ER (entity relationship) view showing relationships between the tables stored in the DB 11.

FIG. 4 shows a data example of information that is stored in the account table 12-1. Information showing the balance of that particular account is assigned to each account number and stored in the account table 12-1. Here, the account corresponding to the actor X is [00x], while the account corresponding to the actor Y is [00y].

FIG. 5 shows a data example of the account update details table 12-2. Account numbers, transaction types, transaction amounts, post-transaction balances, and update dates are assigned to and stored in the account update details table 12-2. The account number is information that corresponds to the account numbers stored in the account table 12-1. The transaction type is information that shows whether the transaction is for an incoming payment or an outgoing expenditure. The transaction amount is information that shows the amount of money to be transacted in the corresponding account. The post-transaction balance is information that shows the balance of the account after the corresponding transaction has been settled. The update date is information that shows the date on which the corresponding transaction was settled, and on which the information was stored in the account update details table 12-2.

FIG. 6 shows a data example of information that is stored in the stocked product table 12-3. Information about the stockist, the product code, and the stocked quantities is assigned and stored in the stocked product table 12-3. The stockist is information that identifies the possessor (i.e., the actor) who possesses the corresponding product. The product code is information that identifies the products possessed by the corresponding stockist. The stocked quantity is information that shows the quantity in stock of products indicated by the corresponding product code.

FIG. 7 shows a data example of the stock update details table 12-4. Information about the stockist, product code, the stock update type, the updated stocked quantity, and the update date is assigned to and stored in the stock update details table 12-4. The stockist is information that corresponds to the stockiest stored in the stocked product table 12-3. The product code is information that corresponds to the product codes stored in the stocked product table 12-3. The stock update type is information showing whether the stock is coming in or going out. The updated stock quantity is information showing the quantity of stock after the corresponding update has been performed. The update date is information that shows the date on which the corresponding update was made, and on which the information was stored in the stock update details table 12-4.

Figure 8:
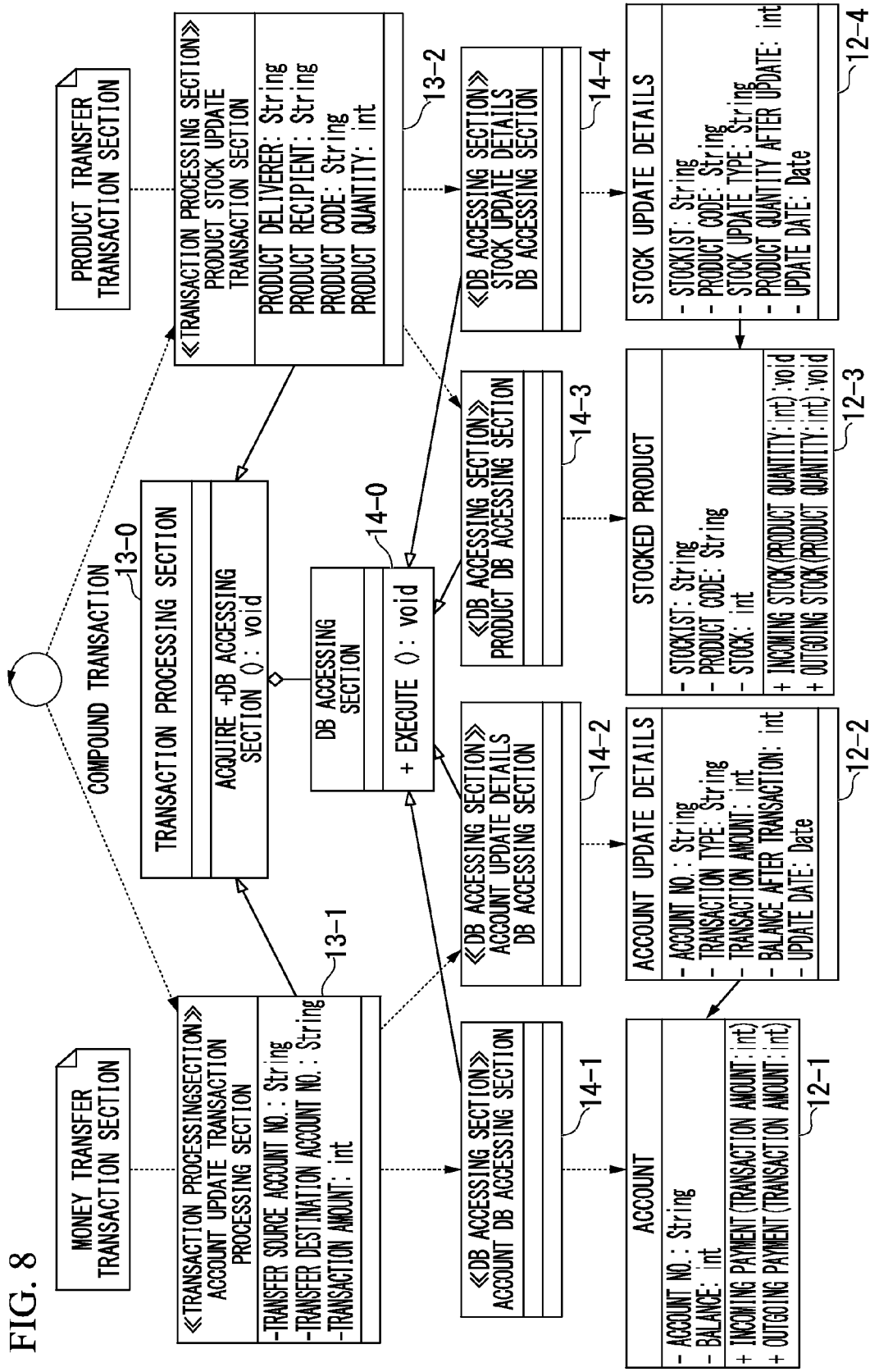
FIG. 8 is a class diagram showing an example of a transaction processing description mechanism according to an embodiment of the present invention.

FIG. 8 is a class diagram showing an example of the implementation of the respective sections provided in the transaction processing description mechanism a of the present embodiment.

For example, the transaction processing section 13-0 is defined as a super-class of the transaction processing sections 13-1 and 13-2. A method of acquiring previously assigned DB accessing sections 14-1 to 14-4 is defined in the transaction processing section 13-0. In addition, the transaction processing section 13-1 (i.e., an account update transaction processing section) and the transaction processing section 13-2 (i.e., a product stock update transaction section), which are sub-classes inheriting the transaction processing section 13-0 are defined. For example, the transaction processing section 13-1 performs transaction processing to move funds from the account 00y which corresponds to the stockist Y to the account 00x which corresponds to the stockist X. In contrast, the transaction processing section 13-2 performs transaction processing to deliver stock which has the product code P and which belongs to the stockist X to the stockist Y. The plurality of DB accessing sections 14-1 to 14-4 are assigned to the respective transaction processing sections 13-1 and 13-2. Here, DB accessing sections 14-1 to 14-4 make the data access requests, which are necessary for the transaction processing sequences that accompany the delivery of a product, to the account table and stocked product table.

The DB accessing sections 14-1 to 14-4 make data access requests to any of the tables from among the plurality of tables 12-1 to 12-4 that are stored in the DB 11. Here, a data access request is processing such as, for example, data creation, data reading, data updating, and data deletion. The DB accessing section 14-0 is defined as a super-class of the DB accessing sections 14-0 to 14-4. In addition, the DB accessing section 14-1 (i.e., the account DB accessing section) which accesses data in the account table 12-1, the transaction processing section 14-2 (i.e., the account update details DB accessing section) which accesses data in the account update details table 12-2, the DB accessing section 14-3 (i.e., the product DB accessing section) which accesses data in the stocked product table 12-3, and the DB accessing section 14-4 (i.e., the stock update details DB accessing section) which accesses data in the stock update details table 12-4, which are all inherited sub-classes of the DB accessing section 14-0, are also defined.

Figure 9:
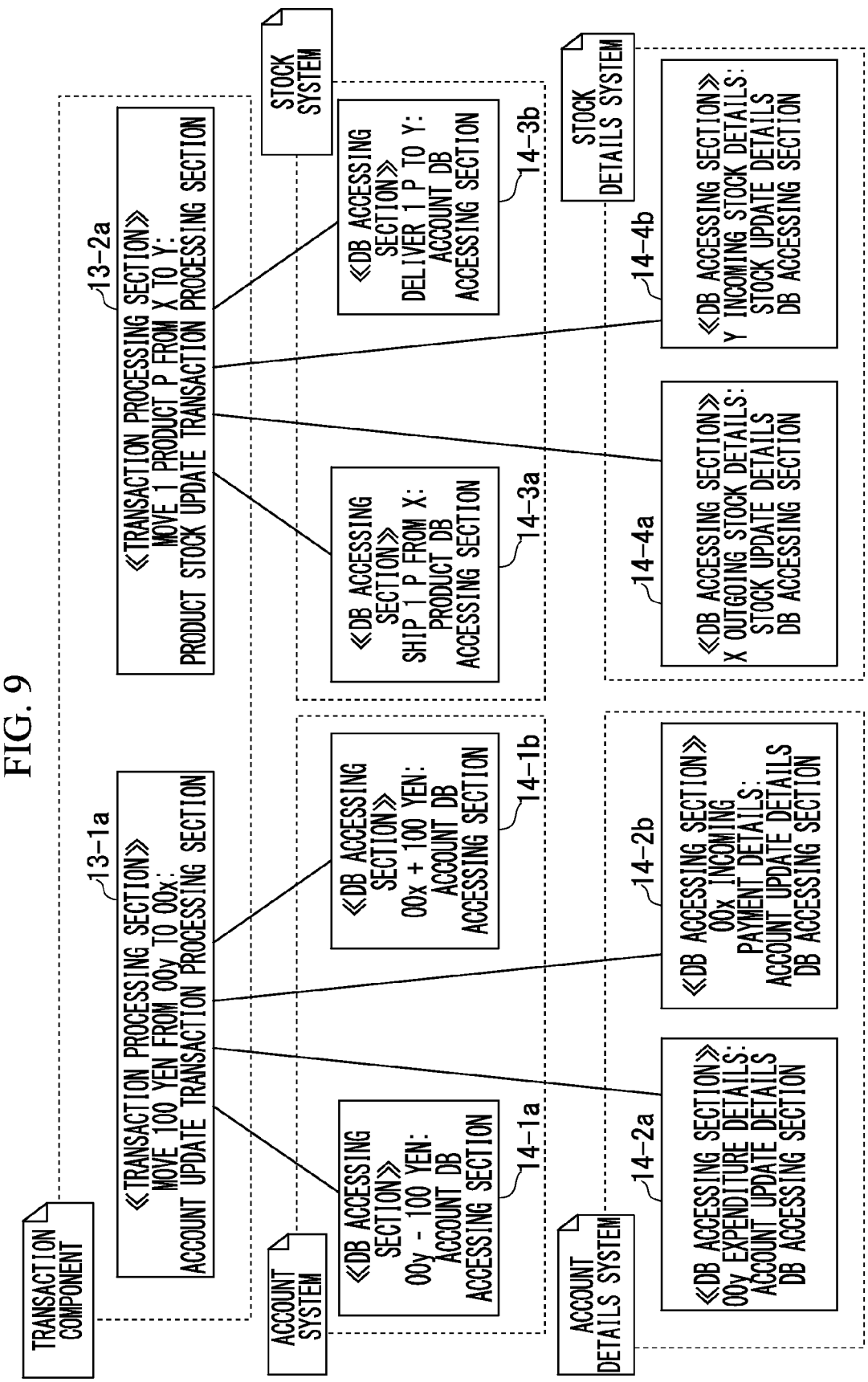
FIG. 9 is a view showing an example of a transaction processing section and a DB access section instantiated by an embodiment of the present invention.

FIG. 9 shows an example of the transaction processing sections 13-1a and 13-2a, which are instantiated in the present embodiment based on the class structure shown in FIG. 8, and the DB accessing sections 14-1a, 14-1b, 14-2a, 14-2b, 14-3a, 14-3b, 14-4a and 14-4b. The transaction processing section 13-1a is an instance in which transaction processing is performed in order to move 100 yen from the account [00y] to the account [00x]. The transaction processing section 13-1a creates instances with four previously assigned DB accessing sections, namely, it creates instances with the DB accessing section 14-1a, the DB accessing section 14-1b, the DB accessing section 14-2a, and the DB accessing section 14-2b. Here, the DB accessing section 14-1a and the DB accessing section 14-1b are processing sections that access data in the account table 12-1. The DB accessing section 14-1a subtracts 100 yen from the balance in the account [00y], and the DB accessing section 14-1b adds 100 yen to the balance in the account [00x]. The DB accessing section 14-2a and the DB accessing section 14-2b are processing sections that access data in the account update details table 12-2. The DB accessing section 14-2a updates the expenditure details in the account [00y], and the DB accessing section 14-2b updates the payment received details in the account [00x].

The transaction processing section 13-2a is an instance in which transaction processing is performed in order to move the product P from the actor X to the actor Y. The transaction processing section 13-2a creates instances with four previously assigned DB accessing sections, namely, it creates instances with the DB accessing section 14-3a, the DB accessing section 14-3b, the DB accessing section 14-4a, and the DB accessing section 14-4b. Here, the DB accessing section 14-3a and the DB accessing section 14-3b are processing sections that access data in the stocked product table 12-3. The DB accessing section 14-3a subtracts one stocked article of the product P held by X, and the DB accessing section 14-3b adds one stocked article of the product P held by Y. The DB accessing section 14-4a and the DB accessing section 14-4b are processing sections that access data in the stock update details table 12-4. The DB accessing section 14-4*a* updates the outgoing stock details in the stock update details for X, and the DB accessing section 14-4*b* updates the incoming stock details in the stock update details for Y.

Returning to FIG. 1, the transaction processing registration section 15 is a data access request registration section that receives data access requests for each data unit stored in the DB 11, and stores them in a transaction processing storage section 16 provided in its own storage area. It is also possible for the transaction processing registration section 15 to receive a registration from any DB accessing section from among the plurality of DB accessing sections 14-1 to 14-4, and to store it in the transaction processing storage section 16, however, in the present embodiment, an example is shown in which the transaction processing registration section 15 receives a transaction processing section to which a plurality of DB accessing sections for a plurality of data units have been previously assigned, and stores the input transaction processing section in the transaction processing storage section 16. Specifically, the transaction processing registration section 15 stores the instantiated transaction processing section 13-1 and the instantiated transaction processing section 13-2 in the transaction processing storage section 16. Namely, the transaction processing registration section 15 receives transaction processing requests (i.e., the transaction processing sections 13-1 and 13-2) to which a plurality of data access requests (i.e., the DB accessing sections 14-1 to 14-4) for a plurality of data units have been previously assigned, and stores them in the transaction processing storage section 16.

The transaction processing storage section 16 is a data access request storage section which stores data access requests for any data unit from among the plurality of data units stored in the DB 11. In the present embodiment, specifically, the instantiated transaction processing section 13-1 and the instantiated transaction processing section 13-2 are stored therein. As is described above, the transaction processing section 13-1 and the transaction processing section 13-2 are sections to which the plurality of DB accessing sections 14-1 to 14-4 which make data access requests have been assigned.

Figures 10, 11:
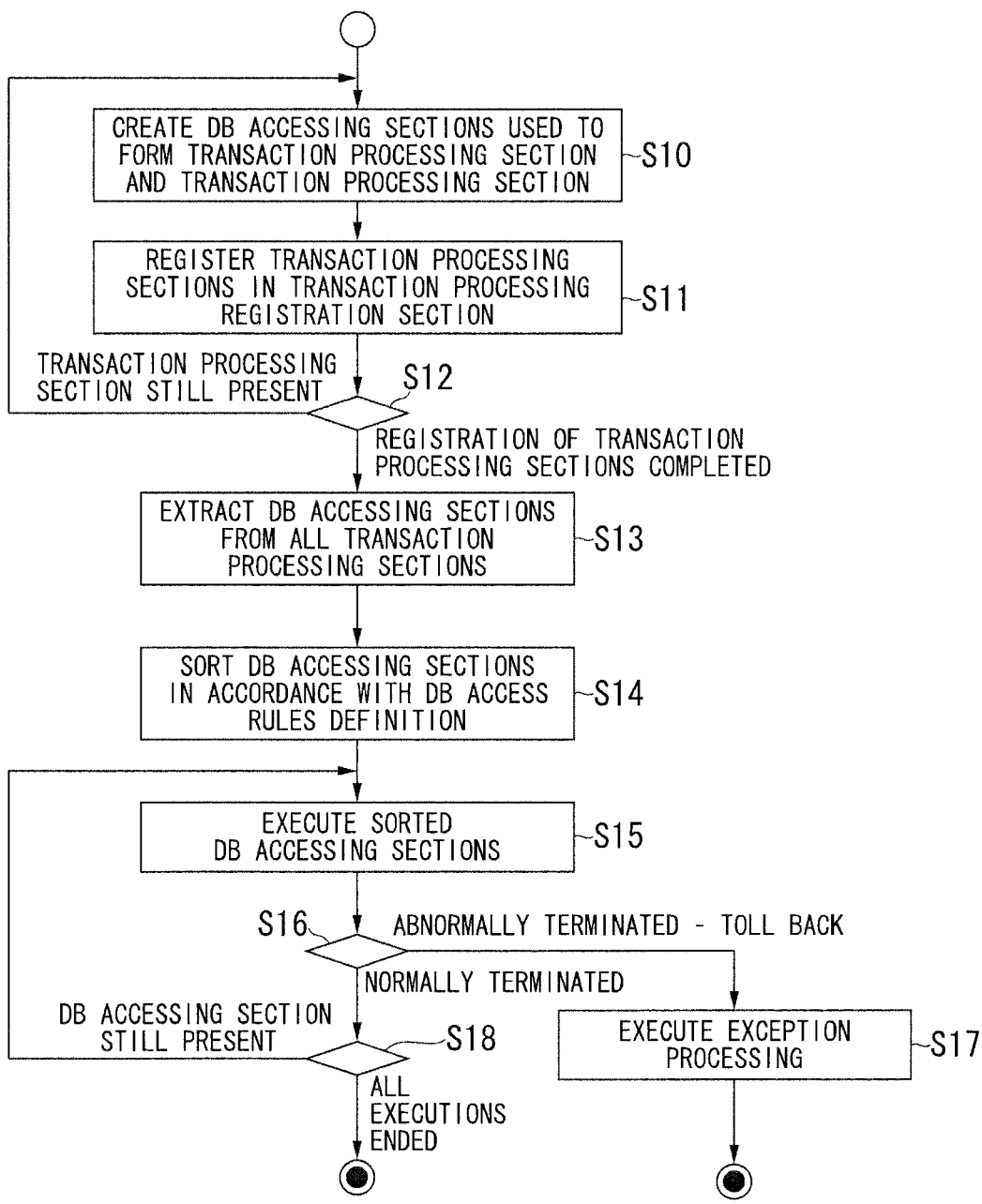
FIG. 10 is a view showing a data example of information stored in a DB access rules storage section according to an embodiment of the present invention.
FIG. 11 is a flowchart showing an example of the operation of a data access device according to an embodiment of the present invention.

The DB access rules storage section 17 is a sequence storage section in which, for each data unit of the data stored in the DB 11, the sequences for accessing the data contained in that data unit are stored. FIG. 10 shows a data example of the DB access rules stored in the DB access rules storage section 17. Here, the sequence for a particular DB table (i.e., the DB table updating sequence) is assigned to each DB table name. For example, the sequence number [3] is assigned to the account table, the sequence number [4] is assigned to the account update details table, the sequence number [1] is assigned to the stocked product table, and the sequence number [2] is assigned to the stock update details table. Here, of the plurality of data units (i.e., tables), data units which are accessed at a relatively high frequency are allocated a relatively later sequential order, while data units which are accessed at a relatively low frequency are allocated a relatively earlier sequential order. As a result, if the updated sequence for a table is with one of the later orders, the length of time for which that table is locked is shorter accordingly. Consequently, it is possible to raise the processing concurrency of such units with the other processing units. Namely, for example, if the frequency of accesses to an account table is greater than the frequency of accesses to a product table, then the sequential order for accessing the account is placed after the sequential order for accessing the product. Next, because the detail tables do not allow post-update information to be obtained if neither an account nor a product has been operated, then in a sequence determined from a business perspective, the sequential order of the detail tables are placed after the sequential order of the account tables. In this manner, in order to make the accessing sequence unique, one method may be to decide the rules of the accessing sequence by combining the accessing sequence from the perspective of transaction requirements with the accessing sequence as a performance measure in case of concentrated accesses. In addition to deciding the sequence in accordance with the access frequency of each table in this manner, it is also possible, for example, to set the access sequence in the record sequence (i.e., the account number sequence), or to set the access sequence in accordance with the ss frequency of each record.

The DB access sorting section 18 is an execution sequence sorting section that, in accordance with the sequences stored in the DB access rules storage section 17, determines the execution sequence for the plurality of data access requests stored in the transaction processing storage section 16 of the transaction processing registration section 15. Specifically, the DB access sorting section 18 extracts instances of the plurality of DB accessing sections 14-1 to 14-4 that are assigned to instances of the plurality of transaction processing sections 13-1 and 13-2 which are stored in the transaction processing storage section 16, and, based on the tables which the extracted instances of the DB accessing sections are going to update, and on the sequence stored in the DB access rules storage section 17, determines the execution sequence for the instances of the DB accessing sections 14-1 to 14-4.

The DB access executing section 19 is a data access request executing section that performs data access request execution processing to lock those data units in which the data is to be accessed by the data access requests stored in the transaction processing storage section 16, and executes the data access requests sequentially in accordance with the execution sequence determined by the DB access sorting section 18, and, after it has performed the data access request execution processing for all of the data access requests stored in the transaction processing storage section 16, releases all of the locks it had placed on the data units. Specifically, the DB access executing section 19 causes data accessing to be executed in instances of the DB accessing sections 14-1 to 14-4 in accordance with the execution sequence determined by the DB access sorting section 18. At this time, the DB access executing section 19 locks each of the tables to be updated by instances of the DB accessing sections 14-1 to 14-4. Once the access processing by the instances of all of the DB accessing sections 14-1 to 14-4 has been completed, the DB access executing section 19 releases all of the locks.

Next, an example of an operation of the data access device 10 of the present embodiment will be described. FIG. 11 is a flowchart showing an example of an operation of the data access device 10 of the present embodiment. Firstly, the data access device 10 creates instances of the transaction processing sections 13-1 and 13-2 in accordance with the transaction processing requirements. In addition, the generated transaction processing sections 13-1 and 13-2 each create instances of the plurality of DB accessing sections 14-1 to 14-4 that have been assigned to them (step S10). Next, the transaction processing registration section 15 registers the generated instances of the transaction processing sections 13-1 and 13-2 in the transaction processing storage section 16 (step S11). If the data access device 10 is to then perform registration for another transaction processing section 13 (i.e., if it is determined in step S12 that a transaction processing section does exist), the routine returns to step S10.

If the registration of another transaction processing section is not to be performed in step S12 (i.e., if it is determined in step S12 that the transaction processing registration has been completed), the DB access executing section 19 extracts, from each transaction processing section stored in the transaction processing storage section 16, the DB accessing sections 14-1 to 14-4 that have been assigned to that transaction processing section (step S 13). The DB access sorting section 18 then determines an execution sequence based on the sequence stored in the DB access rules storage section 17, and sorts the DB accessing sections 14-1 to 14-4 (step S14). The DB access executing section 19 then causes the DB accessing sections 14-1 to 14-4 to execute data access processing in accordance with the sequence determined by the DB access sorting section 18 (step S15).

If the data access processing executed in step S15 is terminated abnormally, the DB access executing section 19 rolls back the updated data and executes predetermined exception processing (step S17). The routine is then ended. If the data access processing executed in step S15 is terminated normally, then if other DB accessing sections exist that have not been executed (i.e., if it is determined in step S18 that DB accessing sections do exist), the DB access executing section 19 returns to step S15. Once the data access processing by all of the DB accessing sections 14-1 to 14-4 that correspond to the transaction processing sections 13 stored in the transaction processing storage section 16 has ended (i.e., if it is determined in step S18 that all executing has ended), the routine is ended.

Here, an example has been described in which, when the data access device 10 has created instances of the transaction processing sections 13-1 and 13-2, the transaction processing sections 13-1 and 13-2 each create instances of the plurality of DB accessing sections 14-1 to 14-4 that have been assigned to them, however, it is also possible for the instances of the DB accessing sections 14-1 to 14-4 to be created after the registration of the transaction processing sections 13-1 and 13-2, but before their execution (for example, before step S3).

Figure 12:
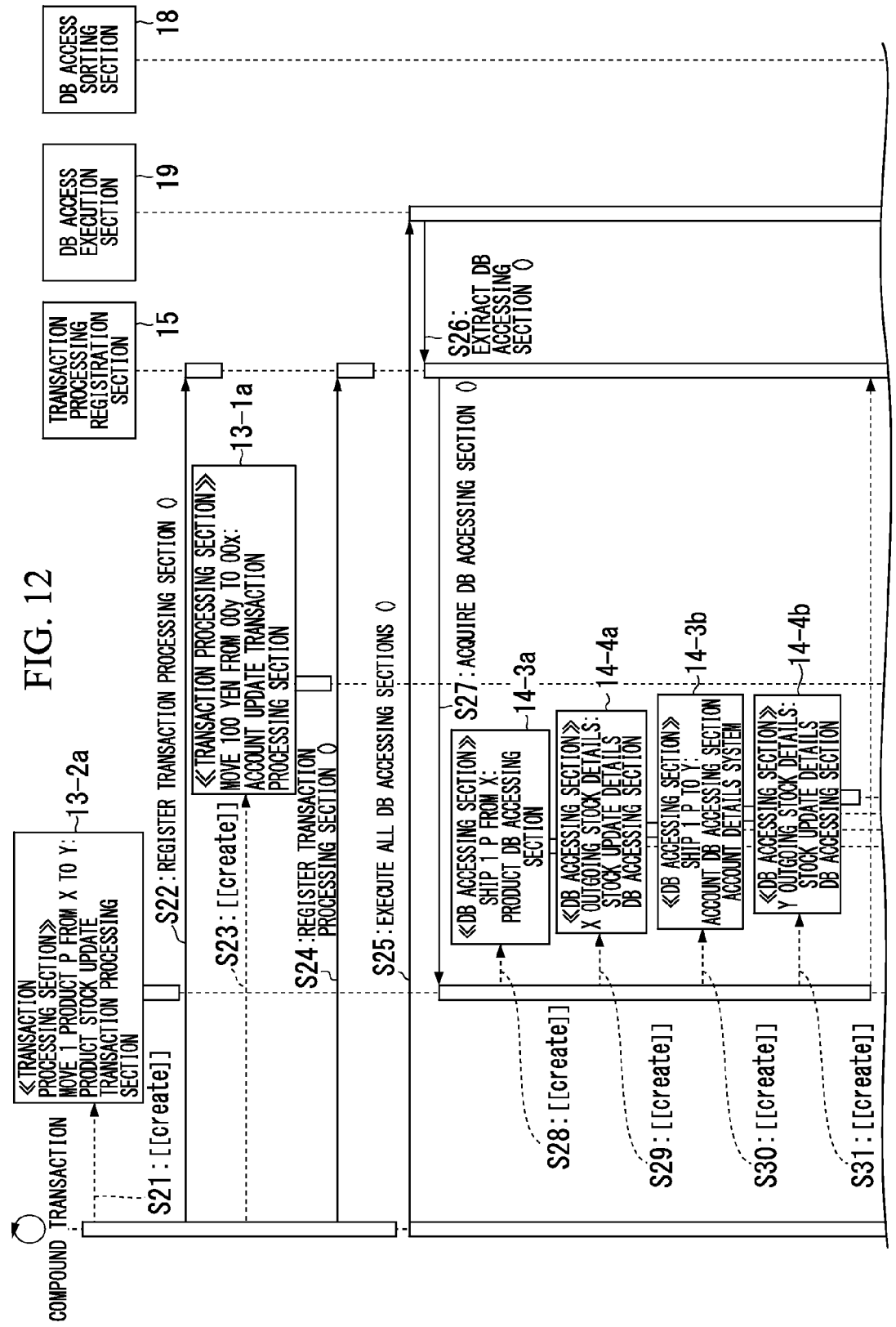
FIG. 12 is a sequence diagram showing an example of the operation of a data access device according to an embodiment of the present invention.
Figure 13:
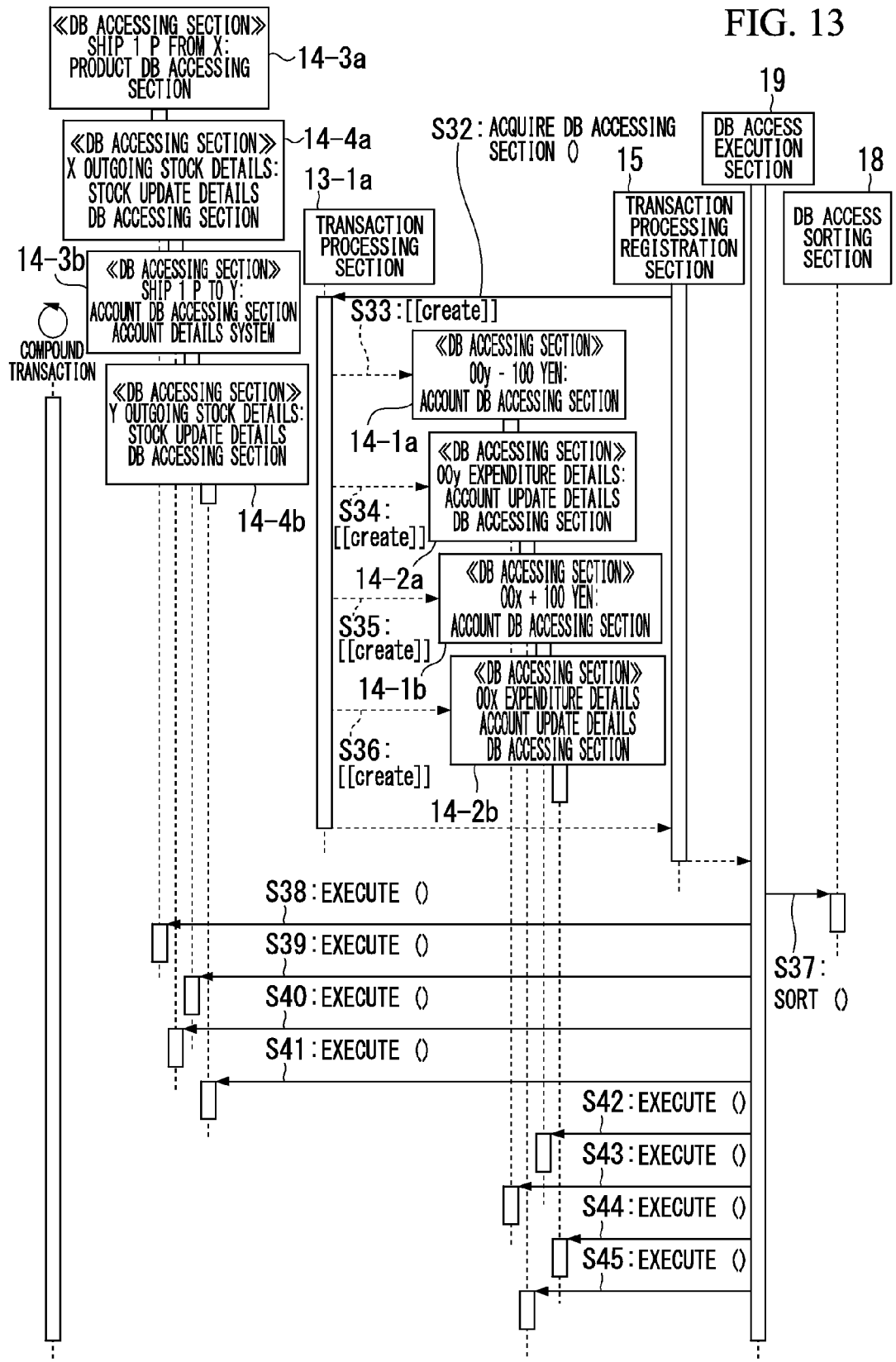
FIG. 13 is a sequence diagram showing an example of the operation of a data access device according to an embodiment of the present invention.

FIG. 12 and FIG. 13 are sequence diagrams that more specifically show an example of the operation of the data access device 10 which was described with reference made to FIG. 11. The data access device 10 creates the transaction processing section 13-2a which is an instance of the transaction processing section 13-2 in which one of the product P is moved from the actor X to the actor Y (step S21). The data access device 10 registers the generated transaction processing section 13-2a in the transaction processing registration section 15. The transaction processing registration section 15 receives the registration of the transaction processing section 13-2a (step S22).

Next, the access device 10 creates the transaction processing section 13-1a which is an instance of the transaction processing section 13-1 in which 100 yen is moved from the account [00y] which corresponds to the actor Y to the account [00x] which corresponds to the actor X (step S23). The data access device 10 registers the created transaction processing section 13-1a in the transaction processing registration section 15. The transaction processing registration section 15 receives the registration of the created transaction processing section 13-1a (step S24).

The data access device 10 then makes a data access execution request to the transaction processing registration section 15 (step S25). When the DB access executing section 19 reads the instances of the plurality of transaction processing sections 13 which are stored in the transaction processing registration section 15 (steps S26 and S27), the transaction processing section 13-2a creates instances of the DB accessing section 14-3a, the DB accessing section 14-4a, the DB accessing section 14-3b, and the DB accessing section 14-4b that have been assigned to itself (steps S20 to S31).

Moving to FIG. 13, the transaction processing section 13-1a creates instances of the DB accessing section 14-1a, the DB accessing section 14-2a, the DB accessing section 14-1b, and the DB accessing section 14-2b that have been assigned to itself (steps S32 to S36). The DB access sorting section 18 then determines an execution sequence for the data accessing based on the instances of the plurality of DB accessing sections 14 that were created by the transaction processing section 13-2a and are stored in the transaction processing registration section 15, and on the instances of the plurality of DB accessing sections 14 that were created by the transaction processing section 13-1a and are stored in the transaction processing registration section 15 (step S37).

Based on the execution sequence determined by the DB access sorting section 18, the DB access executing section 19 firstly locks the stocked product table 12-3, and then causes the DB accessing section 14-3a and the DB accessing section 14-3b that are accessing the data in the stocked product table 12-3 to be executed (step S38 and S39). Next, it locks the stock update details table 12-4, and then causes the DB accessing section 14-4a and the DB accessing section 14-4b that are accessing the data in the stock update details table 12-4 to be executed (step S40 and S41). Next, it locks the account table 12-1, and then causes the DB accessing section 14-1b and the DB accessing section 14-1a that are accessing the data in the account table 12-1 to be executed (step S42 and S43). Next, it locks the account update details table 12-2, and then causes the DB accessing section 14-2b and the DB accessing section 14-2a that are accessing the data in the account update details table 12-2 to be executed (step S44 and S45).

By performing this type of processing, it is possible to avoid deadlocks between a plurality of processing units that are performing processing in parallel with each other, and to access data while maintaining a high level of processing performance.

Next, in order to even more accurately describe an embodiment of the present invention, data access processing using conventional technology and data accessing using the present embodiment will be described. Here, processing is illustrated in which input information and recorded information a and b are checked, predetermined calculations are performed, and the database is updated so that information c is counted up [X transaction].

Figure 14B:
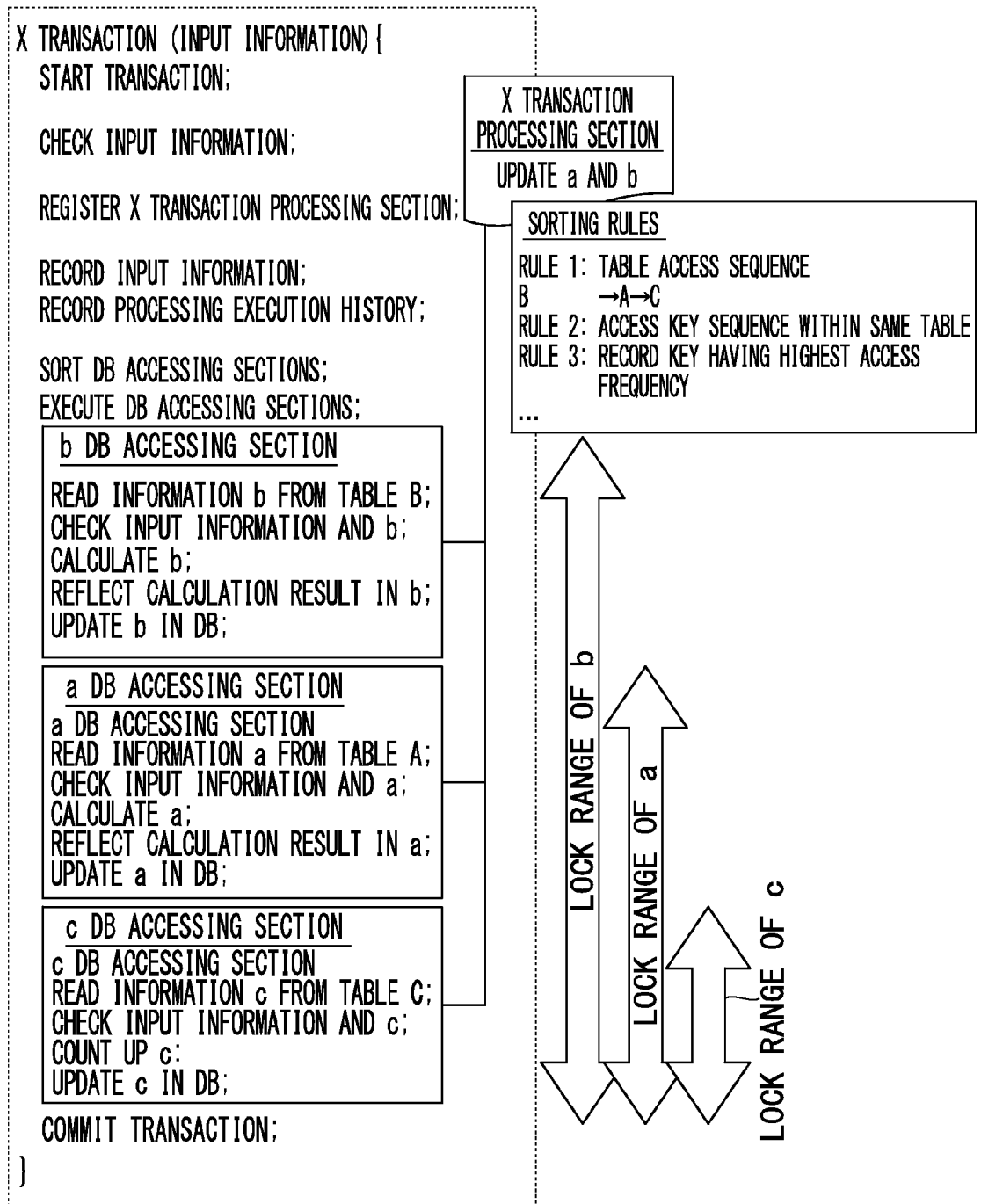
FIG. 14B is a view showing a transaction processing image of data access processing according to an embodiment of the present invention.

FIG. 14A shows a transaction processing image of data access processing based on the conventional technology, while FIG. 14B shows a transaction processing image of data access processing based on the present embodiment. In the conventional technology, in a case in which Table A, Table B, and Table C are accessed, after Table A has been locked and the information a has been read, Table B is locked and the information b is read, and Table C is locked and the information c is read thereafter. After all of the calculation processing and access processing has ended, the locks are released.

In contrast to this, as is shown in FIG. 14B, in the present embodiment, after the registration of a transaction processing has been performed, the DB accessing section assigned to the transaction processing is sorted, and the processing for the locking and the processing for the data accessing are performed in sequence for each individual table. As a consequence, it is possible to shorten the lock time of each individual data unit compared with the conventional technology. Furthermore, by performing the updating of data units that have a relatively high access frequency after the updating of other data units that have a relatively low access frequency, it is possible to make the lock time of the data units having a high access frequency even shorter.

Figure 15:
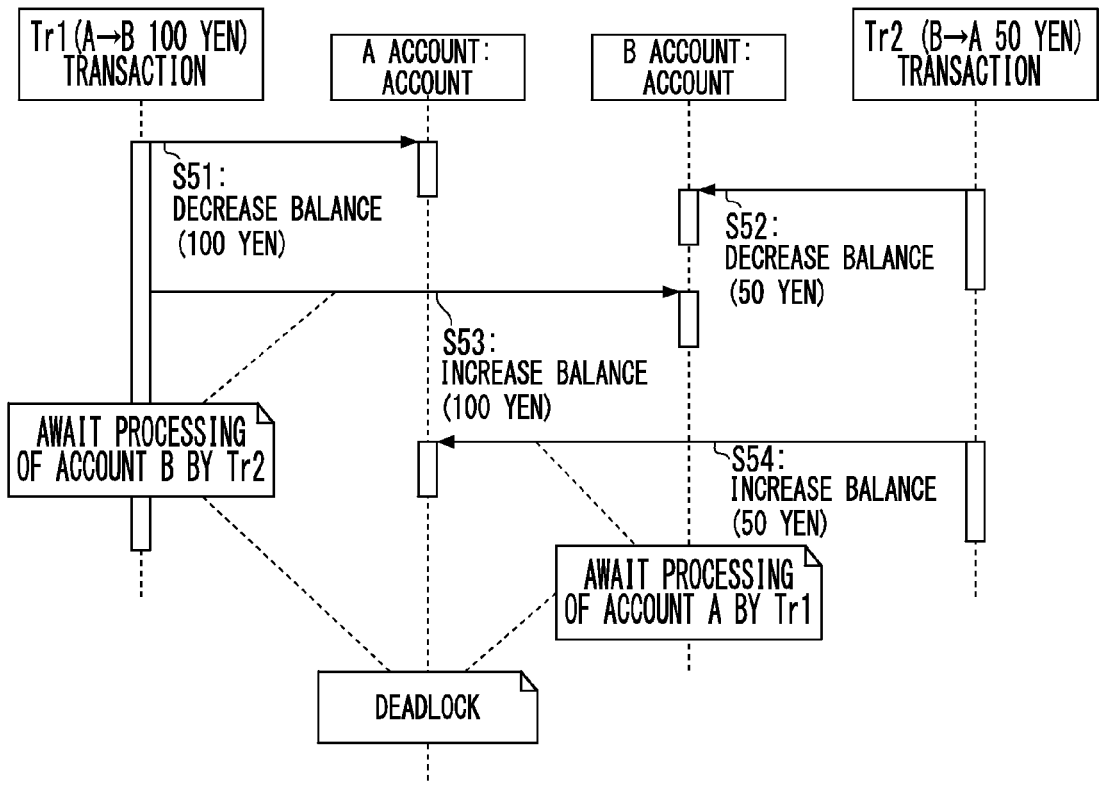
FIG. 15 is a view showing an example of the occurrence of a deadlock according to the conventional technology.

FIG. 15 is a sequence diagram based on the conventional technology showing an example in which, when transaction processing, namely, the movement of money is constructed using logics in which balances are decreased and increased, data accessing is performed by a plurality of processing units (i.e., transactions). For example, in transaction 1 (Tr1), account A is locked and the balance thereof is decreased (step S51), while in transaction 2 (Tr2), account B is locked and the balance thereof is decreased (step S52). Next, if Tr1 is a transaction in which the balance is increased for account B (step S53), then because account B is locked by Tr2, it is placed on standby. In the same way, if Tr2 is a transaction in which the balance is increased for account A (step S54), then because account A is locked by Tr1, a deadlock is generated and the data cannot be accessed.

Figure 16:
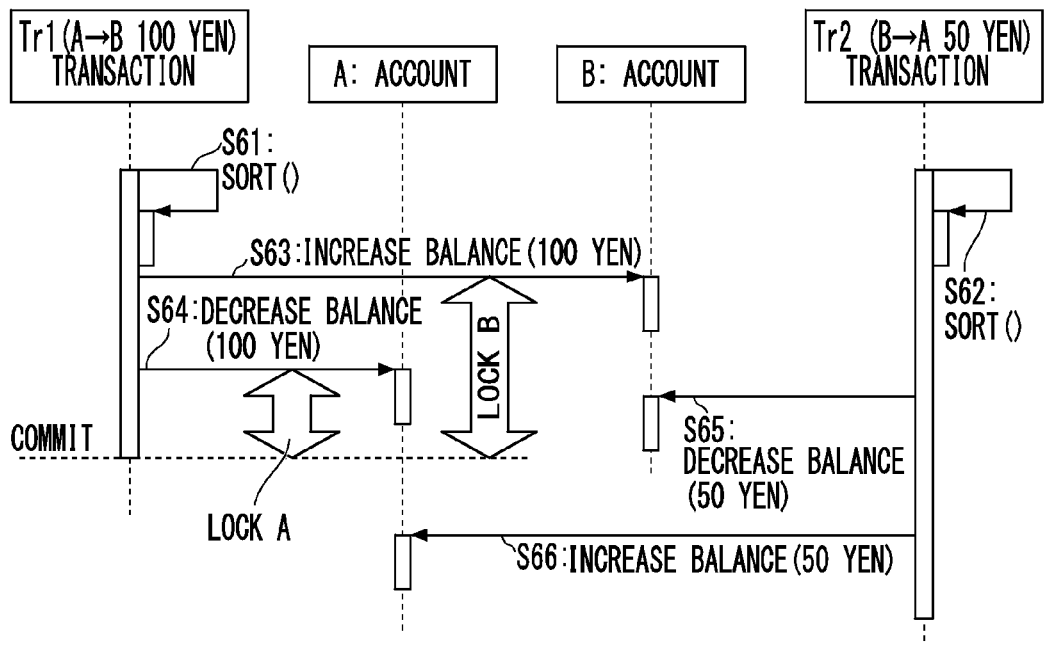
FIG. 16 is a view showing an example of data accessing being performed based on (comprising) a plurality of transactions using the present embodiment.

In contrast to this, FIG. 16 is a sequence diagram showing an example in which data accessing is performed by the plurality of transactions Tr1 and Tr2 using the data access device 10 of the present embodiment. The definition of the DB access rules is in the sequence of account B first, and then account A.

After the transaction processing section has been registered in the transaction Tr1, when the execution sequence of the DB accessing sections has been determined (step S61), data accessing in the sequence of, firstly, the account B and then the account A is performed by the DB access rules. Namely, the balance of account B is increased by 100 yen (step S63), and, thereafter, the balance of account A is decreased by 100 yen (step S64). In contrast, after the transaction processing section has been registered in the transaction Tr2, in cases when the execution sequence of the DB accessing sections has been determined (step S62) as well, data accessing in the sequence of, firstly, the account B and then the account A is performed. Namely, the balance of account B is decreased by 50 yen (step S63), and, thereafter, the balance of account A is increased by 50 yen (step S66). In this manner, in either transaction, the processing begins with the accessing of data in the account B first, and then proceeds to the accessing of data in the account A. Because of this, it is possible to avoid a deadlock situation.

Figure 17:
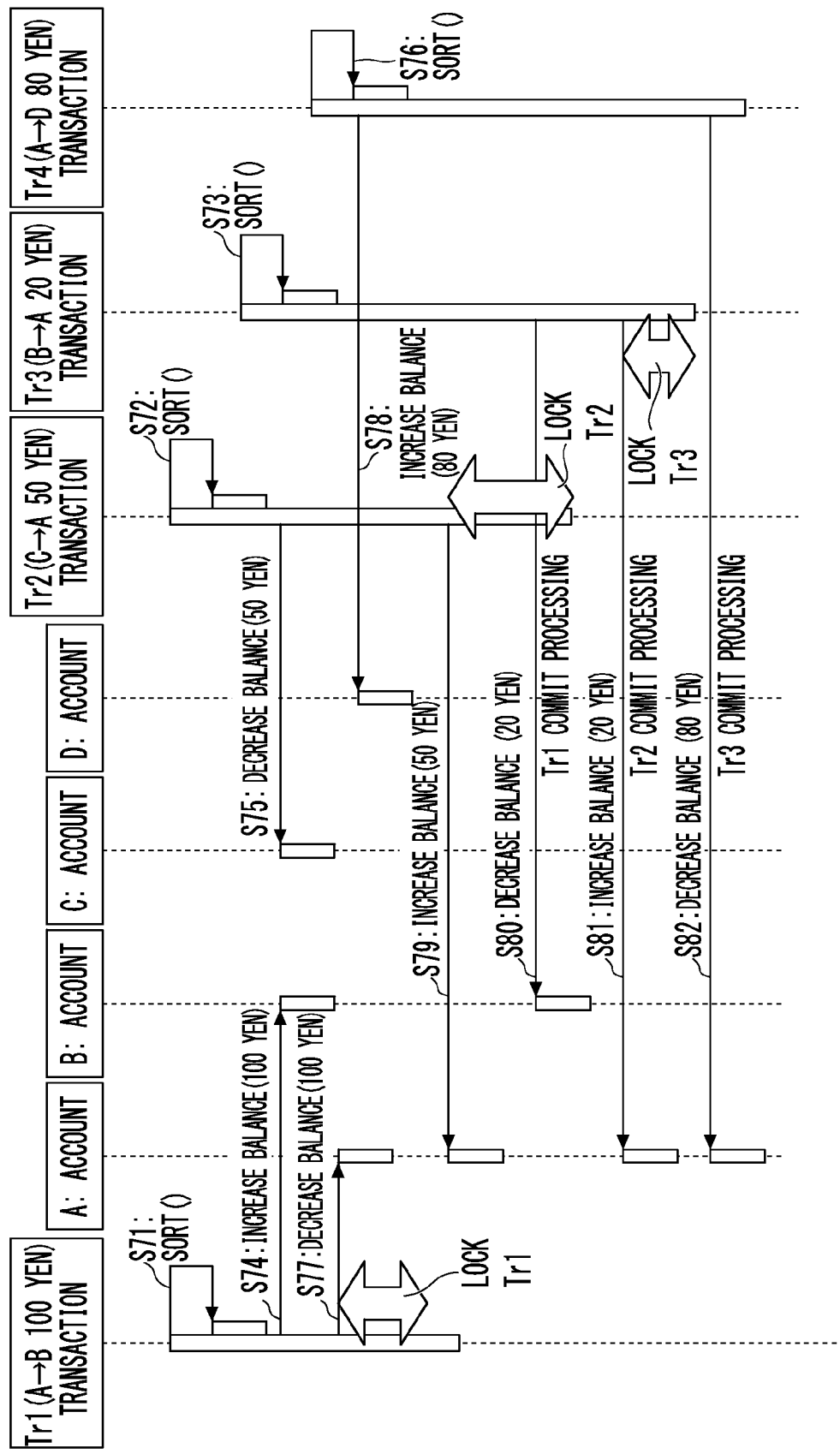
FIG. 17 is a view showing an example of data accessing being performed based on a plurality of transactions using the present embodiment.

FIG. 17 is an example in which, while avoiding a deadlock, the lock time of the account A which has a high access frequency is shortened so that simultaneous processing concurrency is improved.

In this example, using the data access device 10 of the present embodiment, data accessing in accounts A to D is performed by a plurality of transactions Tr1, Tr2, Tr3, and Tr4. The definition of the DB access rules is in the sequence of account B first, then account C, account D, and account A. Account A is the account with the highest access frequency.

Furthermore, if the respective sections shown in FIG. 1 are constructed by utilizing a class structure such as that illustrated in the present embodiment, then because a programmer who develops a transaction processing program using such functional sections is able to perform the implementation task with no need to consider adapting the processing routine and the like in order to avoid a deadlock situation, an improvement in the programming efficiency can be expected.

Note that in the present embodiment, the storage section accessed by the data access device 10 is a database in which the data units are in the form of tables, however, it is also possible, for example, to use storage areas in which the data units are in the form of files. In addition, an example has been described in which updating is performed for each one of the tables in the database that serve as the data units of the present embodiment, however, it is also possible, for example, to construct different DB accessing sections in record units in the tables.

Note that it is also possible to record a program that achieves the functions of the processing sections of the present invention on a computer-readable recording medium, and to access data by causing a computer system to read and execute the program recorded on this recording medium. Note that the term 'computer system' used here includes both OS and hardware such as peripheral devices and the like.

Moreover, 'computer system' may also include a WWW system which is provided with a homepage providing environment (or display environment). Moreover, the term 'computer readable recording medium' also refers to portable media such as flexible disks, magneto-optical disks, ROM, and CD-ROM and the like, and storage devices such as hard disks that are built into a computer system. Furthermore, 'computer readable recording medium' also includes devices that hold a program for a fixed time such as the internal volatile memory (RAM) in a computer system comprising the server or client when the program is transmitted via a network such as the Internet or via a communication line such as a telephone line.

Moreover, the aforementioned program may also be transmitted from a computer system in which the program is stored on a storage device or the like to another computer system via a transmission medium, or via a transmission wave within the transmission medium. Here, the term 'transmission medium' which transmits the program refers to a medium having a function of transmitting information, for example, a network such as the Internet, or a communication line such as a telephone line. Moreover, the above described program may also be designed to fulfill a portion of the above described functions. Furthermore, the aforementioned program may also achieve the above described functions in combination with a program which is already recorded on the computer system, namely, may be what is known as a differential file (i.e., a differential program).

INDUSTRIAL APPLICABILITY

The present invention can be applied to a data access device in a computer that performs parallel processing, and makes it possible to avoid deadlock situations in the data access device and maintain a superior processing performance.

REFERENCE SYMBOLS

10 . . . Data access device
11 . . . DB
12 . . . Table
13 . . . Transaction processing section
14 . . . DB accessing section
15 . . . Transaction processing registration section
16 . . . Transaction processing storage section
17 . . . DB access rules storage section
18 . . . DB access sorting section
19 . . . DB access executing section

The invention claimed is:

1. A data access device that accesses a data storage section in which data is stored in a plurality of data units, comprising:
  a sequence storage section which stores in advance a sequence according to which accesses should be made to data contained in the data units;

a data access request storage section which stores data access requests to access one of the data units from among the plurality of data units stored in the data storage section;

a data access request registration section which receives a plurality of the data access requests, and stores the data access requests in the data access request storage section;

an execution sequence sorting section which determines an execution sequence for the plurality of data access requests that are stored in the data access request storage section in accordance with the sequence stored in the sequence storage section; and a data access request execution section which sequentially performs data access request execution processing in accordance with the execution sequence determined by the execution sequence sorting section with the data unit which is a target of the data access request locked, and after the data access request execution processing has been performed for all of the data access requests stored in the data access request storage section, releases all of the locks on the data units, wherein the sequence storage section stores the sequence such that the data which are accesses at a relatively high frequency set at a relatively later sequential order, and the data units which are accessed at a relatively low frequency set a relatively earlier sequential order.

2. The data access device according to claim 1, wherein the data access request registration section receives transaction processing requests to which a plurality of the data access requests to access a plurality of the data units have already been assigned, and stores the data access requests that correspond to the input relevant transaction processing requests in the data access request storage section.

3. A data access method employed by a data access device including a data storage section which stores data in a plurality of data units, a sequence storage section which stores in advance a sequence in which accesses are made to data contained in the data units, and a data access request storage section which stores data access requests to access one of the data units from among the plurality of data units stored in the data storage section, the data access method comprising the steps of:

receiving a plurality of the data access requests so as to store the data access requests in the data access request storage section;

determining an execution sequence for the plurality of data access requests that are stored in the data access request storage section in accordance with the sequence stored in the sequence storage section; and sequentially performing data access request execution processing in accordance with the determined execution sequence with the data unit which is a target of the data access request locked, and after the data access request execution processing has been performed for all of the data access requests stored in the data access request storage section, releasing all of the data units from locking, wherein the sequence storage section stores the sequence such that the data units which are accessed at a relatively high frequency set at a relatively later sequential order, and the data units which are accessed at a relatively low frequency set at a relatively earlier sequential order.

4. A non-transitory computer readable medium containing a data access program that causes a computer of a data access device including a data storage section which stores data in a plurality of data units, a sequence storage section which stores in advance a sequence in which accesses are made to data contained in the data units, and a data access request storage section which stores data access requests to access one of the data units from among the plurality of data units stored in the data storage section, to execute the steps of:

receiving a plurality of the data access requests so as to store the data access requests in the data access request storage section;

determining an execution sequence for the plurality of data access requests that are stored in the data access request storage section in accordance with the sequence stored in the sequence storage section; and sequentially performing data access request execution processing in accordance with the determined execution sequence with the data unit which is a target of the data access request locked, and after the data access request execution processing has been performed for all of the data access requests stored in the data access request storage section, releasing all of the locks on the data units, wherein the sequence storage section stored the sequence such that data units which are accessed at a relatively high frequency set at a relatively later sequential order, and the data units which are accessed at a relatively low frequency set at a relatively earlier sequential order.

5. The data access device according to claim 1, wherein:

the data access device performs a compound transaction type of transaction processing including a delivery of a product and a payment of corresponding remuneration;

the plurality of data units include tables relating to accounts and tables relating to stocked products; and the sequence storage section stores the sequence such that the tables relating to the stocked products set at an earlier sequential order and the tables relating to the accounts set at a relatively later sequential order.

6. The data access device according to claim 1, wherein the data units includes tables or records, and the sequence storage section stores the sequence such that the tables or records which are accessed at a relatively high frequency set at a relatively later sequential order, and the tables or records which are accessed at a relatively low frequency set at a relatively earlier sequential order.

7. The data access device according to claim 1, wherein:

the data access device performs a compound transaction type of transaction processing including a delivery of a product and a payment of corresponding remuneration;

the plurality of data units include tables relating to accounts and tables relating to stocked products; and the sequence storage section stores the sequence such that the sequence order of records stored in the tables relating to the stocked products and the tables relating to the accounts is set in accordance with access frequency of each of the records.

8. The data access method according to claim 3, wherein:

the data access device performs a compound transaction type of transaction processing including a delivery of a product and a payment of corresponding remuneration;

the plurality of data units include tables relating to accounts and tables relating to stocked products; and the sequence storage section stores the sequence such that the tables relating to the stocked products set at an earlier sequential order and the tables relating to the accounts set at a relatively later sequential order.

9. The data access method according to claim 3, wherein the data units includes tables or records, and the sequence storage section stores the sequence such that the tables or records which are accessed at a relatively high frequency set at a relatively later sequential order, and the tables or records which are accessed at a relatively low frequency set at a relatively earlier sequential order.

10. The data access method according to claim 3, wherein:
the data access device performs a compound transaction type of transaction processing including a delivery of a product and a payment of corresponding remuneration;
the plurality of data units include tables relating to accounts and tables relating to stocked products; and
the sequence storage section stores the sequence such that the sequence order of records stored in the tables relating to the stocked products and the tables relating to the accounts is set in accordance with access frequency of each of the records.

11. The non-transitory computer readable medium according to claim 4,
wherein the data access device performs a compound transaction type of transaction processing including a delivery of a product and a payment of corresponding remuneration;
the plurality of data units include tables relating to accounts and tables relating to stocked products; and
the sequence storage section stores the sequence such that the tables relating to the stocked products set at an earlier sequential order and the tables relating to the accounts at a relatively later sequential order.

12. The non-transitory computer readable medium according to claim 4,
wherein the data units includes tables or records, and the sequence storage section stores the sequence such that the tables or records which are accessed at a relatively high frequency set at a relatively later sequential order, and the tables or records which are accessed at a relatively low frequency set at a relatively earlier sequential order.

13. The non-transitory computer readable medium according to claim 4, wherein:
the data access device performs a compound transaction type of transaction processing including a delivery of a product and a payment of corresponding remuneration;
the plurality of data units include tables relating to accounts and tables relating to stocked products; and
the sequence storage section stores the sequence such that the sequence order of records stored in the tables relating to the stocked products and the tables relating to the accounts is set in accordance with access frequency of each of the records.

14. A data access device comprising:
a data base including an account table storing information showing a balance of each account assigned to each account number, an account update details table storing the account numbers, transaction types and transaction amounts in association with each other, a stocked product table storing stockists of a stocked product, a product code of the stocked product and a stocked quantity of the stocked product in association with each other, and a stock update details table storing the stockists, the product code, stock update types of the stocked product, and updated stocked quantity of the stocked product;
an access rules storage section configured to store in advance a sequential order of the stocked product table, the stock update details table, the account table, and then the account update details table;
a transaction processing storage section configured to store data access requests to access one of the stocked product table, the stock update details table, the account table, and the account update details table;
a transaction processing registration section configured to receive a plurality of the data access requests, and store the data access requests in the transaction processing storage section;
an access sorting section configured to sort an execution sequence for the plurality of data access requests that are stored in the transaction processing storage section in accordance with the sequential order stored in the access rules storage section;
and an access executing section configured to sequentially perform data access request execution processing in accordance with the sequential order determined by the access rules storage section with one of the stocked product table, the stock update details table, the account table, and the account update details table which is a target of the data access request locked, and after the data access request execution processing has been performed for all of the data access requests stored in the transaction processing storage section, release all of the locks on the stocked product table, the stock update details table, the account table, and the account update details table.

* * * * *

UNITED STATES PATENT AND TRADEMARK OFFICE
CERTIFICATE OF CORRECTION

PATENT NO.        : 8,666,959 B2
APPLICATION NO.   : 13/394548
DATED             : March 4, 2014
INVENTOR(S)       : Hirose et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 5 days.

Signed and Sealed this
Twenty-ninth Day of September, 2015

Michelle K. Lee
*Director of the United States Patent and Trademark Office*